July 8, 1969 D. R. MATTINGLY 3,454,266
AIRCRAFT ENGINE PREHEATER
Filed Feb. 28, 1967
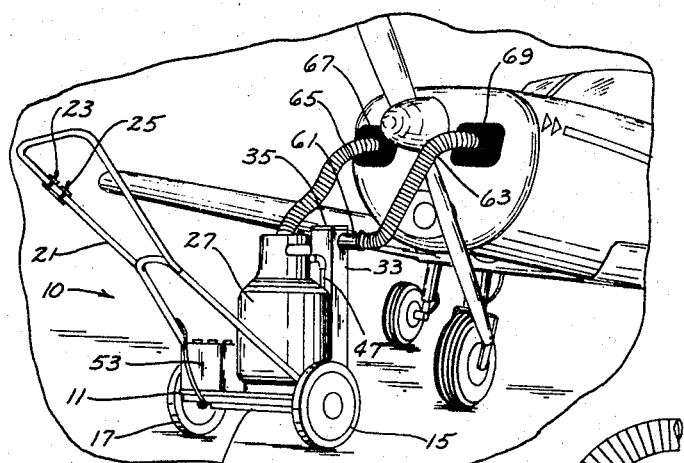
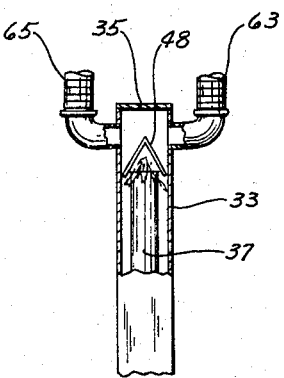
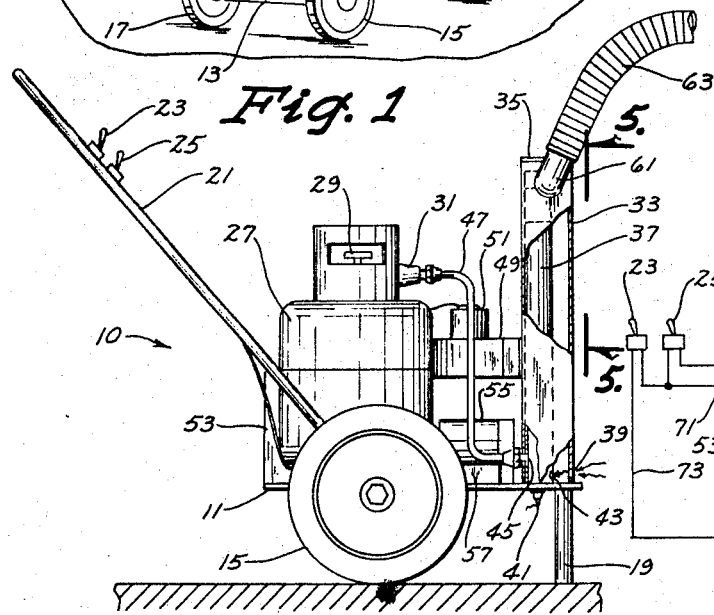
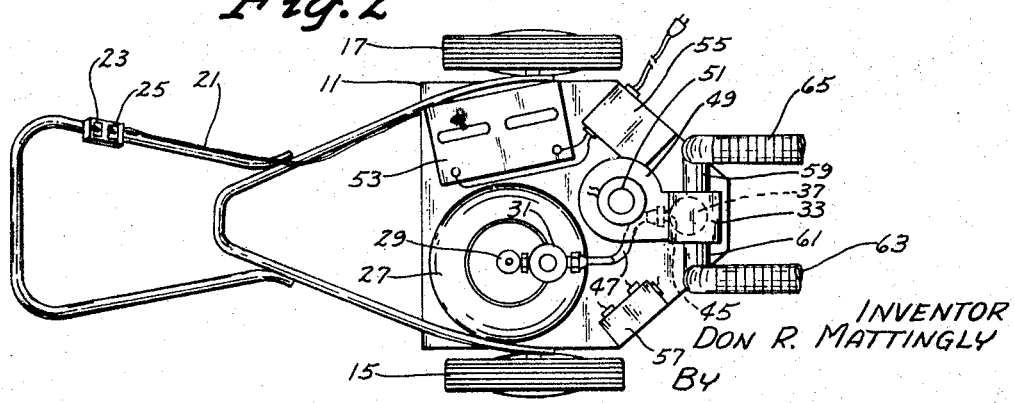
INVENTOR
DON R. MATTINGLY
BY
Zarley, McKee & Thomte
ATTORNEYS

United States Patent Office 3,454,266
Patented July 8, 1969

3,454,266
AIRCRAFT ENGINE PREHEATER
Don R. Mattingly, Chariton, Iowa, assignor to Dean Arnold, Russell, Iowa
Filed Feb. 28, 1967, Ser. No. 619,447
Int. Cl. F02n *17/02;* B64d *47/00*
U.S. Cl. 263—19                                                6 Claims

ABSTRACT OF THE DISCLOSURE

A portable engine preheater, comprising a heat chamber mounted on a supporting means and having a combustion chamber provided therein. Gas is supplied to the combustion chamber and is ignited by a semi-automatic ignition system. The heated air is forced from the heat chamber into an air conduit by a fan means and is supplied to the area adjacent the engine to be preheated. The fan means and ignition means are operated by a control means and are battery powered.

---

Pilots quite frequently must store their airplanes in areas in which heat is not available during times of cold weather. A large majority of the airports do not have heated hangers and as a result, the airplanes are difficult to start after being subjected to the cold weather for a period of time.

Therefore, is is a principal object of this invention to provide an aircraft engine preheater.

A further object of this invention is to provide an aircraft engine preheater which is safe and easy to operate.

A further object of this invention is to provide an aircraft engine preheater which will heat the engine for running in approximately five to ten minutes.

A further object of this invention is to provide an aircraft engine preheater which is portable.

A further object of this invention is to provide an aircraft engine preheater which has an automatic spark ignition and forced air.

A further object of this invention is to provide an aircraft engine preheater which reduces engine wear in cold weather starting.

A further object of this invention is to provide an aircraft engine preheater which operates on propane.

A further object of this invention is to provide an aircraft engine preheater which is economical of manufacture, durable in use and refined in appearance.

These and other objects will be apparent to those skilled in the art.

This invention consists in the construction, arrangements, and combination of the various parts of the device, whereby the objects contemplated are attained as hereinafter more fully set forth, specifically pointed out in the claims, and illustrated in the accompanying drawings in which:

FIG. 1 is a perspective view of the device;
FIG. 2 is a side elevational view of the device;
FIG. 3 is a top elevational view of the device;
FIG. 4 is a wiring diagram of electrical circuitry of the device; and
FIG. 5 is a sectional view as seen on line 5—5 of FIG. 2.

The preheater of this invention is seen in FIG. 1 and is generally designated by the reference numeral 10. A metal platform 11 has an axle 13 secured thereto with wheels 15 and 17 rotatably mounted at opposite ends thereof. A support leg 19 is secured to the lower forward end of platform 11 and extends downwardly therefrom to support the platform in a stationary horizontal position as seen in FIG. 2. Handle means 21 is secured to platform 11 at opposite sides thereof by welding or the like and extends upwardly and rearwardly therefrom as best seen in FIGS. 2 and 3. Switches 23 and 25 are mounted on handle means 21 and are of the single pole type.

A gas tank 27 is secured or mounted on platform 11 at a point adjacent wheel 15 and has its center of gravity positioned slightly rearwardly of axle 13. Gas tank 27 is of conventional design and has a valve 29 provided thereon adapted to supply gas to a gas regulator 31. Preferably, propane gas or the like should be used in this preheater in conjunction with tank 27, however, tank 27 and its contents may be substituted by a small can of butane or the like.

A hollow heat tube 33 is secured by any convenient means to platform 11 at the central forward end thereof and extends upwardly therefrom as illustrated in FIG. 2. Tube 33 is of metal construction such as steel or the like and is sealed at its upper end by a cap 35. A hollow flame tube 37 is positioned within tube 33, as seen in FIGS. 2 and 5, and is secured at its lower end to platform 11 by any convenient means such as welding or the like. An air intake opening 39 is provided in heat tube 33 and an air intake opening 43 is provided in flame tube 37 thereby placing the lower interior of tube 37 in communication with atmosphere. A spark plug 41 is secured to platform 11 and extends upwardly therethrough so that its inner end is positioned within the interior of tube 37. A gas opening 45 is provided in tubes 33 and 37 and is adapted to threadably receive a gas line 47 extending from regulator 31. The upper end of tube 37 is provided with a baffle 48 to deflect the heat downwardly from the upper end thereof.

A fan means 49 powered by an electric motor 51 is secured to heat tube 33 at a point above spark plug 41 and is adapted to supply air to the interior of heat tube 33 upon activation of the motor 51. A battery 53 and a battery charger 55 are mounted on platform 11 adjacent wheel 17 as best illustrated in FIG. 3. Preferably battery 53 is of the 12-volt direct current type and battery charger 55 is preferably designed to be connected to a source of 110-volt electrical current to charge the battery. Also mounted on platform 11 is a conventional spark coil 57. Secured to the opposite upper sides of heat tube 33 are a pair of ducts 59 and 61 which are in communication with the interior or heat tube 33. As seen in FIGS. 2 and 3, ducts 59 and 61 extend outwardly and upwardly from heat tube 33 and have flexible tubes 63 and 65 detachably secured thereto respectively. If desired, the opposite ends of tubes 63 and 65 may have suitable attachments mounted thereon to facilitate their attachment to the aircraft engine or they may simply be extended through the air intake openings 67 and 69 on opposite sides of the propeller.

The wiring diagram for this preheater is illustrated in FIG. 4 and it can be seen therefrom that one side of switch 25 is connected to battery 53 by wire 71 and the other side thereof to spark coil 57 by wire 73. Spark coil 57 is electrically connected to spark plug 41 by wire 75 and to one terminal 77 of battery 53 by wire 79. Terminal 77 is electrically connected to one side of fan motor 51 by wire 81. The other side of fan motor 51 is connected to one side of switch 25 by wire 83 and the other side of switch 25 is connected to wire 71. If the battery charger 55 is utilized, it would be connected to the terminals of battery 53 in conventional fashion.

In operation, the flexible tubes 63 and 65 are inserted into openings 67 and 69 respectively to cause the hot air discharged therefrom to be passed over the aircraft engine to preheat the same. Switch 25 is then opened which causes fan means 49 to be activated thus causing air to be blown from the interior of heat tube 33, through ducts 59 and 61 and through flexible tubes 63 and 65.

Switch 23 is simultaneously opened with switch 25 which causes spark coil 57 to activate spark plug 41 which ignites the gas in flame tube 37. Valve 29 is then opened to cause gas to be supplied to the interior of flame tube 37 by gas line 47 and gas conduit 45. As soon as the gas is ignited by spark plug 41, switch 23 is shut off thereby de-energizing spark plug 41.

The burning gas within flame tube 37 causes the air passing through heat tube 33 to become heated thereby furnishing a constant supply of heated air to the aircraft engine. The heat generated within flame tube 37 heats the air in heat tube 33 by radiating through the walls of the flame tube and also by passing out the upper open end of the flame tube into the interior of the heat tube. Usually, only five to ten minutes are required to preheat the aircraft engine and the device is deactivated by simply turning off valve 29 and then turning off switch 25 to de-activate the fan means.

It can be appreciated that the preheater is extremely mobile due to the provision of the wheels on the platform and the handle which is secured thereto. The preheater is easily moved about and can be quickly and easily transported to the location of the aircraft. The device is safe to operate inasmuch as the spark ignition and forced air eliminates explosion danger. The propane gas or the like eliminates the fire hazard normally connected with gasoline which is usually spilled during the filling of the heaters. The device is extremely convenient to use due to the fact that it is self-contained and does not have to be connected to a source of 110 volts electrical energy. It can also be appreciated that the battery-operated fan means and ignition eliminates the need of a gasoline powered engine which is difficult to operate especially in cold weather.

While the device has been described as being especially well adapted to preheat an aircraft engine, it can be appreciated that the device will work equally as well to heat other engines such as found on tractors, etc. Thus, from the foregoing it can be seen that the device accomplishes at least all of its stated objectives.

Some changes may be made in the construction and arrangement of my aircraft engine preheater without departing from the real spirit and purpose of my invention, and it is my intention to cover by my claims, any modified forms of structure or use of mechanical equivalents which may be reasonably included within their scope.

I claim:

1. In a portable engine preheater,
a supporting means,
a heat chamber on said supporting means,
a combustion chamber within said heat chamber,
said combustion chamber being adapted to be operatively connected to a source of ignitable gas under pressure,
an ignition means operatively communicating with said combustion chamber,
an air conduit means operatively connected to said heat chamber and in communication therewith,
a fan means in communication with said heat chamber and adapted to force the heated air from said heat chamber into said air conduit means,
a control means operatively connected to said ignition means and said fan means adapted to control the operation thereof,
and power means operatively connected to said fan means and ignition means,
said heat chamber being comprised of a vertically disposed hollow tube means extending upwardly from said supporting means, said combustion chamber being comprised of a vertically disposed hollow tube means having its lower end mounted on said supporting means and extending upwardly therefrom within the interior of said heat chamber,
the upper end of said heat chamber being sealed, the upper end of said combustion chamber being open, said open upper end of said combustion chamber being positioned below the sealed upper end of said heat chamber.

2. In a portable engine preheater,
a supporting means,
a heat chamber on said supporting means,
a combustion chamber within said heat chamber,
said combustion chamber being adapted to be operatively connected to a source of ignitable gas under pressure,
an ignition means operatively communicating with said combustion chamber,
an air conduit means operatively connected to said heat chamber and in communication therewith,
a fan means in communication with said heat chamber and adapted to force the heated air from said heat chamber into said air conduit means,
a control means operatively connected to said ignition means and said fan means adapted to control the operation thereof,
and power means operatively connected to said fan means and ignition means,
said ignition means including a spark plug operatively connected to a spark coil, said spark coil being connected to said power means, said power means including a battery means.

3. The preheater of claim 2 wherein said battery means is operatively connected to said fan means and whereby said control means can be selectively operated to cause said spark plug to ignite the gas and to cause said fan means to expel the heated air from said heat chamber.

4. The preheater of claim 1 wherein said air conduit means is operatively connected to said heat chamber at a location below the upper end of said combustion chamber.

5. The preheater of claim 3 wherein said spark plug is adapted to be de-energized after the gas has been ignited.

6. The preheater of claim 1 wherein a baffle means is positioned over the open upper end of the combustion chamber adapted to deflect the heat downwardly from the upper end thereof.

References Cited

UNITED STATES PATENTS

| | | |
|---|---|---|
| 2,015,982 | 10/1935 | Witzel. |
| 2,295,177 | 9/1942 | King. |
| 3,142,479 | 7/1964 | Bartlett et al. |
| 3,319,947 | 5/1967 | Truesdell. |

FREDERICK L. MATTESON, JR., *Primary Examiner.*

EDWARD G. FAVORS, *Assistant Examiner.*